United States Patent
Pefkianakis

(10) Patent No.: US 10,887,819 B2
(45) Date of Patent: Jan. 5, 2021

(54) MOTION DETECTION AND CLASSIFICATION USING MILLIMETER-WAVE SIGNALS

(71) Applicant: HEWLETT PACKARD ENTERPRISE DEVELOPMENT LP, Houston, TX (US)

(72) Inventor: Ioannis Pefkianakis, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/962,949

(22) Filed: Apr. 25, 2018

(65) Prior Publication Data

US 2019/0335377 A1    Oct. 31, 2019

(51) Int. Cl.
*H04W 40/20* (2009.01)
*H04W 16/28* (2009.01)
(Continued)

(52) U.S. Cl.
CPC .......... *H04W 40/20* (2013.01); *H04W 16/28* (2013.01); *H04B 7/0695* (2013.01); *H04B 7/088* (2013.01); *H04B 7/0897* (2013.01); *H04W 84/12* (2013.01)

(58) Field of Classification Search
CPC ..... H04W 40/20; H04W 16/28; H04W 84/12; H04W 72/046; H04W 72/042; H04B 7/0695; H04B 7/088; H04B 7/0897
See application file for complete search history.

(56) References Cited

U.S. PATENT DOCUMENTS

| 7,742,538 B2 | 6/2010 | Kim et al. |
| 8,374,142 B2 | 2/2013 | Cordeiro |

(Continued)

FOREIGN PATENT DOCUMENTS

| GB | 2493561 A | 2/2013 |
| WO | WO-2017091218 | 6/2017 |
| WO | 2018/064327 A1 | 4/2018 |

OTHER PUBLICATIONS

Yang et al, Sensor-Assisted Codebook-Based Beamforming for Mobility Management in 60 GHz WLANs, (Research Paper), Jan. 7, 2016, Published in: Mobile Ad Hoc and Sensor Systems (MASS). 2015 IEEE 12th International Conference on Mobile Ad Hoc and Sensor Systems, 9 Pgs.

(Continued)

*Primary Examiner* — Jaime M Holliday
(74) *Attorney, Agent, or Firm* — McDermott Will & Emery

(57) ABSTRACT

A method of adjusting a link in a wireless communication system is described. The method includes collecting a channel impulse response signal of a client device from a network device of a communication system at a first time instance. The method includes determining a first path data based on the channel impulse response signal. The method also includes making a determination that the client device is physically blocked from the network device, or that a geographical location of the client device has changed. The determination may be made by comparing the first path data with at least a second path data corresponding to at least a second time instance prior to the first time instance. The method further includes changing the communication between the network device and the client device in response to the determination.

19 Claims, 10 Drawing Sheets

(51) Int. Cl.
*H04W 84/12* (2009.01)
*H04B 7/08* (2006.01)
*H04B 7/06* (2006.01)

(56) References Cited

U.S. PATENT DOCUMENTS

| | | | |
|---|---|---|---|
| 9,629,171 | B2 | 4/2017 | Roy et al. |
| 9,787,373 | B1 | 10/2017 | Kohli et al. |
| 2005/0136943 | A1* | 6/2005 | Banerjee ............. H04B 1/7115 455/456.1 |
| 2013/0155847 | A1 | 6/2013 | Li et al. |
| 2015/0010105 | A1* | 1/2015 | Kim .................. H04L 27/2628 375/295 |
| 2017/0111810 | A1* | 4/2017 | Awada ................ H04B 17/309 |
| 2017/0238191 | A1 | 8/2017 | Bahl et al. |
| 2017/0295502 | A1 | 10/2017 | Stirling-Gallacher et al. |
| 2018/0042000 | A1* | 2/2018 | Zhang ..................... H04B 7/04 |
| 2018/0159607 | A1* | 6/2018 | Rybakowski ........ H04B 7/0617 |
| 2019/0271774 | A1* | 9/2019 | Zhang ................. H04L 25/022 |

OTHER PUBLICATIONS

Zhang et al., "OpenMili: A 60 GHz Software Radio Platform with a Reconfigurable Phased-Array Antenna", MobiCom '16 Proceedings of the 22nd Annual International Conference on Mobile Computing and Networking, 2016, 14 pages.

Xu et al., "Spatial and Temporal Characteristics of 60-GHz Indoor Channels", IEEE Journal on Selected Areas in Communications, vol. 20, No. 3, 2002, pp. 620-630.

Wei et al., "Pose Information Assisted 60GHz Networks: Towards Seamless Coverage and Mobility Support", MobiCom '17 Proceedings of the 23rd Annual International Conference on Mobile Computing and Networking, 2017, 14 pages.

Wang et al., "Beamforming Codebook Design and Performance Evaluation for 60GHz Wideband WPANs", IEEE 70th Vehicular Technology Conference Fall, 2009, pp. 1390-1399.

Sur et al., "WiFi-Assisted60 GHz Wireless Networks", MobiCom '17 Proceedings of the 23rd Annual International Conference on Mobile Computing and Networking, 2017, 14 pages.

Sur et al., "BeamSpy: Enabling Robust 60 GHz Links Under Blockage", NSDI'16 Proceedings of the 13th USENIX Conference on Networked Systems Design and Implementation, 2016, pp. 193-206.

Sur et al., "60GHz Indoor Networking through Flexible Beams: A Link-Level Profiling", Proceedings of the 2015 ACM SIGMETRICS International Conference on Measurement and Modeling of Computer Systems, 14 pages.

Smulders et al., "Statistical Characterization of 60-GHz Indoor Radio Channels", IEEE Transactions on Antennas and Propagation, vol. 57, No. 10, 2009, pp. 2820-2829.

Rasekh et al., "Noncoherent mmWave Path Tracking", HotMobile '17 Proceedings of the 18th International Workshop on Mobile Computing Systems and Applications, 2017, 6 pages.

Rappaport et al., "Millimeter Wave Mobile Communications for 5G Cellular: It Will Work!", IEEE Access, vol. 1, 2013, pp. 335-349.

Monica Alleven, "Verizon applauds FCC chairman's move to 5G spectrum", available online at <https://www.fiercewireless.com/tech/verizon-applauds-fcc-chairman-s-move-to-5g-spectrum>, Oct. 5, 2015, 3 pages.

ECMA International, "Standard ECMA-387: High Rate 60 GHz Phy, MAC and PALs", 2nd Edition / Dec. 2010, 302 pages.

Collonge et al., "Influence of the Human Activity on Wide-Band Characteristics of the 60 GHz Indoor Radio Channel", IEEE Transactions on Wireless Communications, vol. 3, No. 6, 2004, pp. 2396-2406.

Cecilia Sulhoff ,"FCC Promotes Higher Frequency Spectrum for Future Wireless Technology", Oct. 22, 2015, 2 pages.

European Search Report and Search Opinion Received for EP Application No. 19170900.5, dated Jul. 5, 2019, 10 pages.

* cited by examiner

MOTION DETECTION AND CLASSIFICATION USING MILLIMETER-WAVE SIGNALS

BACKGROUND

Available multi-GHz spectrum at a millimeter wavelength band, e.g., at 60 GHz, may be used to enhance current wireless local area network (e.g., Wi-Fi) connections to perform as "wire-like" connections. At a 60 GHz, a signal bandwidth of more than 2 GHz can be selected. Data can be transmitted with much higher transmission rates at 60 GHz than at 5 GHz. At 60 GHz, propagation loss is much higher than at 5 GHz, and thus beamforming patterns may be used by the base stations to send directional transmission beams. Directional transmission beams focus radio frequency (RF) energy towards specific spatial directions. Due to transmission beams being directional at millimeter wave frequency band, communication links formed via such directional beams may be affected severely by client device movement and/or because a path of a directional beam to a client device may physically be blocked.

SUMMARY

According to various aspects of the subject technology, a method of adjusting a communication link of a client device of a communication system is described. The method that may be performed by a network controller includes collecting a channel impulse response signal of a client device from a network device of a communication system at a first time instance. The network device is in communication with the client device. The method includes determining a first path data based on the channel impulse response signal. The method also includes determining that the client device is physically blocked from the network device, or that a geographical location of the client device has changed. The determination is made by comparing the first path data with at least a second path data corresponding to at least a second time instance prior to the first time instance. The method further includes changing the communication between the network device and the client device in response to the determination that the client device is physically blocked from the network device or that the geographical location of the client device is changed.

According to various aspects of the subject technology, a network controller of a communication system is described. The network controller includes a memory and a processor that executes instructions from the memory. By executing the instructions, the processor collects a channel impulse response signal of a client device from a network device of a communication system at a first time instance. The network device is in communication with the client device. The processor determines one or more first paths between the client device and the network device in the first path data. The processor also determines one or more second paths between the client device and the network device in at least one second path data corresponding to at least a second time instance prior to the first time instance. The processor further determines that the client device is physically blocked from the network device, or that a geographical location of the client device is changed. The processor makes the determination by comparing the first paths with the second paths. The processor further changes the communication between the network device and the client device in response to the determination that the client device is physically blocked from the network device or that the geographical location of the client device is changed.

According to various aspects of the subject technology, a non-transitory machine-readable storage medium encoded with instructions executable by at least one processor of a network controller is described. By executing the instruction, the processor collects a channel impulse response signal of a client device from a network device of a communication system at a first time instance. The network device is in communication with the client device. The processor determines a first primary path between the client device and the network device in the first path data. The processor also determines a second primary path between the client device and the network device in at least one second path data corresponding to at least a second time instance prior to the first time instance. The processor further determines that the client device is physically blocked from the network device, or that a geographical location of the client device is changed. The processor makes the determination by comparing the first primary path with the second primary path. The processor further changes the communication between the network device and the client device in response to the determination that the client device is physically blocked from the network device or that the geographical location of the client device is changed.

According to various aspects of the subject technology, a network controller of a communication system is described. The network controller includes means for collecting a channel impulse response signal of a client device from a network device of a communication system, determining a path data based on the channel impulse response signal, determining that the client device is physically blocked from the network device, and determining that a geographical location of the client device has changed. The network controller further includes means for changing the communication between the network device and the client device in response to the client device being physically blocked from the network device or the geographical location of the client device having been changed.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein.

Figure 1:
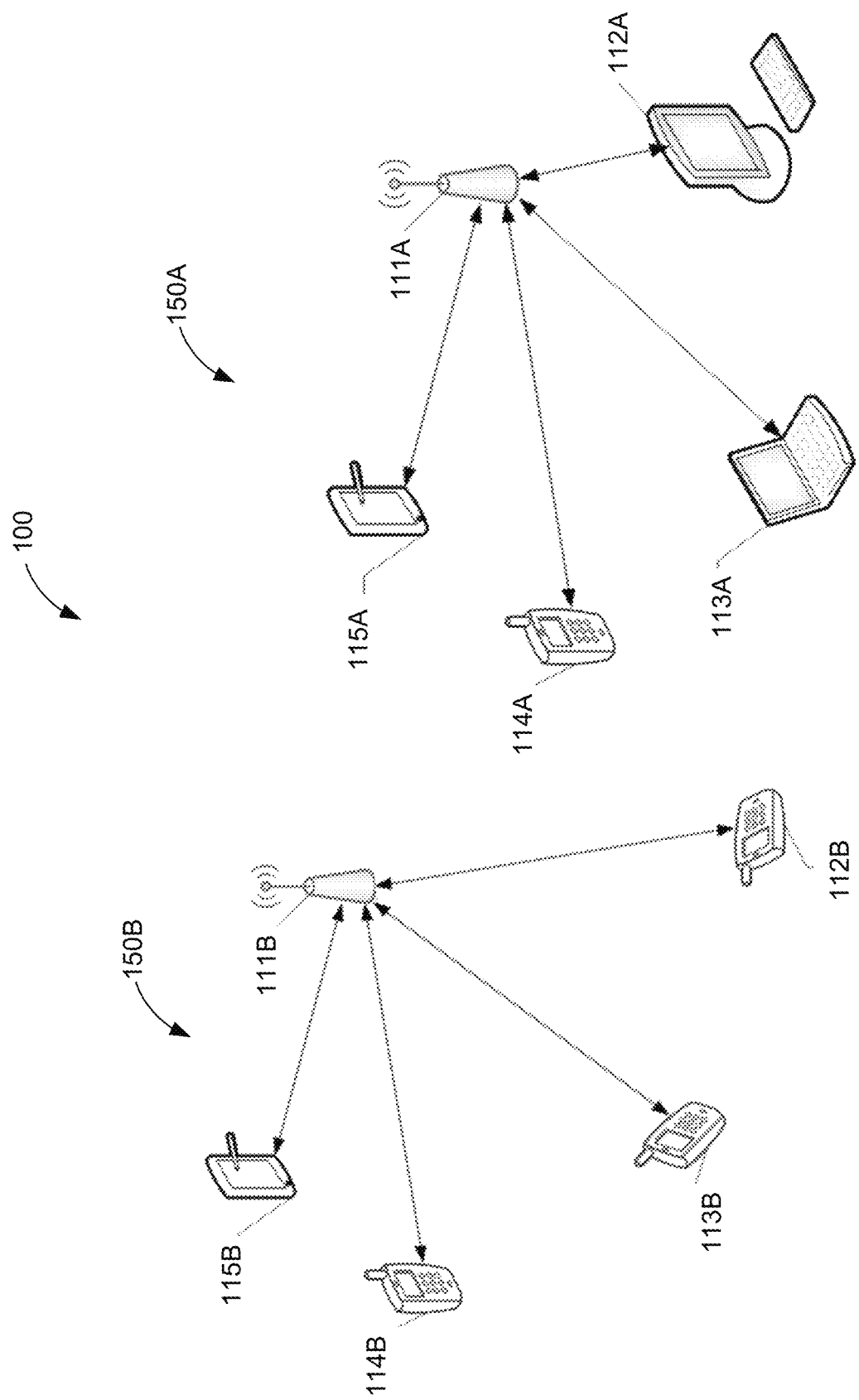
FIG. 1 illustrates a schematic diagram of an exemplary communication system, according to some aspects of the disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

In some embodiments, phased array antennas are used for beamforming in order to overcome the propagation loss of communication links operating at millimeter wavelength band between a network device and a client device. The phased-array antennas use multiple omni-directional antennas that can focus RF energy towards specific spatial directions. Communication links formed via such fine-grained beams may be affected severely when a user holding the client device moves with respect to the network device. The communication links can also be affected when an object, such as user's body, blocks a path between the network device and the client device. Alternatively, a change in the communication link between the network device and the client device when both the network device and the client device are not moving may suggest that an object, such as a human body, has moved and blocked the path.

In some embodiments, a network device of a communication system receives a signal from a client device. The received signal may be generated by the client device in response to a communication signal initiated and transmitted by the network device to the client device. The received signal by the network device may include signals received from a number of paths, e.g., a number of transmission paths, between the client device and the network device. The received signal from the paths may generate relative signal maxima in the received signal. Thus, the received signal may include a path data, e.g., a path signature, of the paths between the client device and the network device. In some embodiments, a communication channel is the paths between the client device and the network device. Thus, the received signal by the network device includes the path data, e.g., the path signature of the communication channel. In some examples, the path signature includes locations and amplitudes of relative maxima in the received signal. In some examples, the received signal by the network device may be generated from a pulse or a burst generated by the client device and thus the received signal is a channel impulse response signal. In some embodiments, the channel impulse response signal may be stored by the network device for each client device that is in communication with the network device. In some examples, the channel impulse response signal may be sampled and filtered before being saved in a memory of the network device. In some embodiments, the client device may similarly receive and store the channel impulse response signal.

In some embodiments, the path data that is a characteristic of the communication channel between the client device and the network device is determined from the channel impulse response signal. The path data defines one or more paths that exist between the client device and the network device. The path data also determines an amplitude of each received signal from each path. In some examples, the path data includes locations and amplitudes of relative maxima in the received signal where a location corresponds to a time delay of the path. Thus, the path data may comprise one or more paths with an amplitude level and a time delay attributed to each path. By comparing the path data of a communication channel at different instances of time, it may be determined that the communication link between the client device and the network device is altered. The change in the communication link may be due to client device moving away from the network device or may be due to an object moving in between the client device and the network device. In some examples, the change may reduce the signal to noise ratio and consequently may reduce a data rate of the communication channel. Thus, the communication link between the client device and the communication system may need to be adjusted. The adjustment may be controlled by a network controller of the communication system that may be coupled to the network device and possibly to other network devices of the communication system. The network controller either may instruct the network device to select another beamforming pattern, or may hand off the client device to another network device.

FIG. 1 illustrates a schematic diagram of an exemplary communication system, according to some aspects of the disclosure. Communication system 100 may include wireless communication subnetworks 150A and 150B. In each one of the wireless communication subnetworks, such as a wireless local area network (WLAN), a basic service set (BSS) includes a plurality of network devices (e.g., WLAN devices). In one aspect, a BSS refers to a set of multiple network devices (e.g., access points) that can communicate in synchronization, rather than a concept indicating a particular area. In the example, the wireless communication subnetwork 150A includes network device 111A and client devices 112A-115A. In addition, the wireless communication subnetwork 150B includes network device 111B and client devices 112B-115B.

As used herein, a "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like. As used herein, an "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

Each of the network devices 111A and 111B and/or client devices 112A-115A and 112B-115B may include a media access control (MAC) layer and a physical (PHY) layer according to IEEE 802.11 standards. In the example, at least one network device (e.g., network device 111A or 111B) is an access point (AP).

In some embodiments, a network controller of the communication system may communicate to the network devices and may control the network devices. In some examples, client device 114A may move away from network device 111A and get closer to network device 111B. Alternatively, an object, e.g., a human body, may move in between client device 114A and network device 111A. Thus, a network controller of the communication system 100 may communicate with network device 111A and network device 111B and hand off client device 114A from network device 111A to network device 111B. In some examples, the network controller is included in one of the network devices, e.g., the network controller is included in network device 111A. Thus, network device 111A may communicate with network device 111B and hand off client device 114A from network device 111A to network device 111B.

A network device may be, for example, an AP, a centralized controller (e.g., network controller), a base station (BS), a node-B, a base transceiver system (BTS), a site controller, a network adapter, a network interface card (NIC), a router, or the like. A client device (e.g., a client device operable by a user) may be, for example, a device with wireless communication capability, a terminal, a wireless transmit/receive unit (WTRU), a user equipment (UE), a mobile station (MS), a mobile terminal, a mobile subscriber unit, a laptop, a non-mobile computing device (e.g., a desktop computer with wireless communication capability) or the like.

In one aspect, an AP is a functional entity for providing access to a distribution system, by way of a wireless medium, for an associated client device. For example, an AP may provide access to the internet for one or more client devices that are wirelessly and communicatively associated with the AP. In FIG. 1, wireless communications between client devices are made by way of an AP. However, when a direct link is established between client devices, the client devices can communicate directly with each other (without using an AP).

Figure 2:
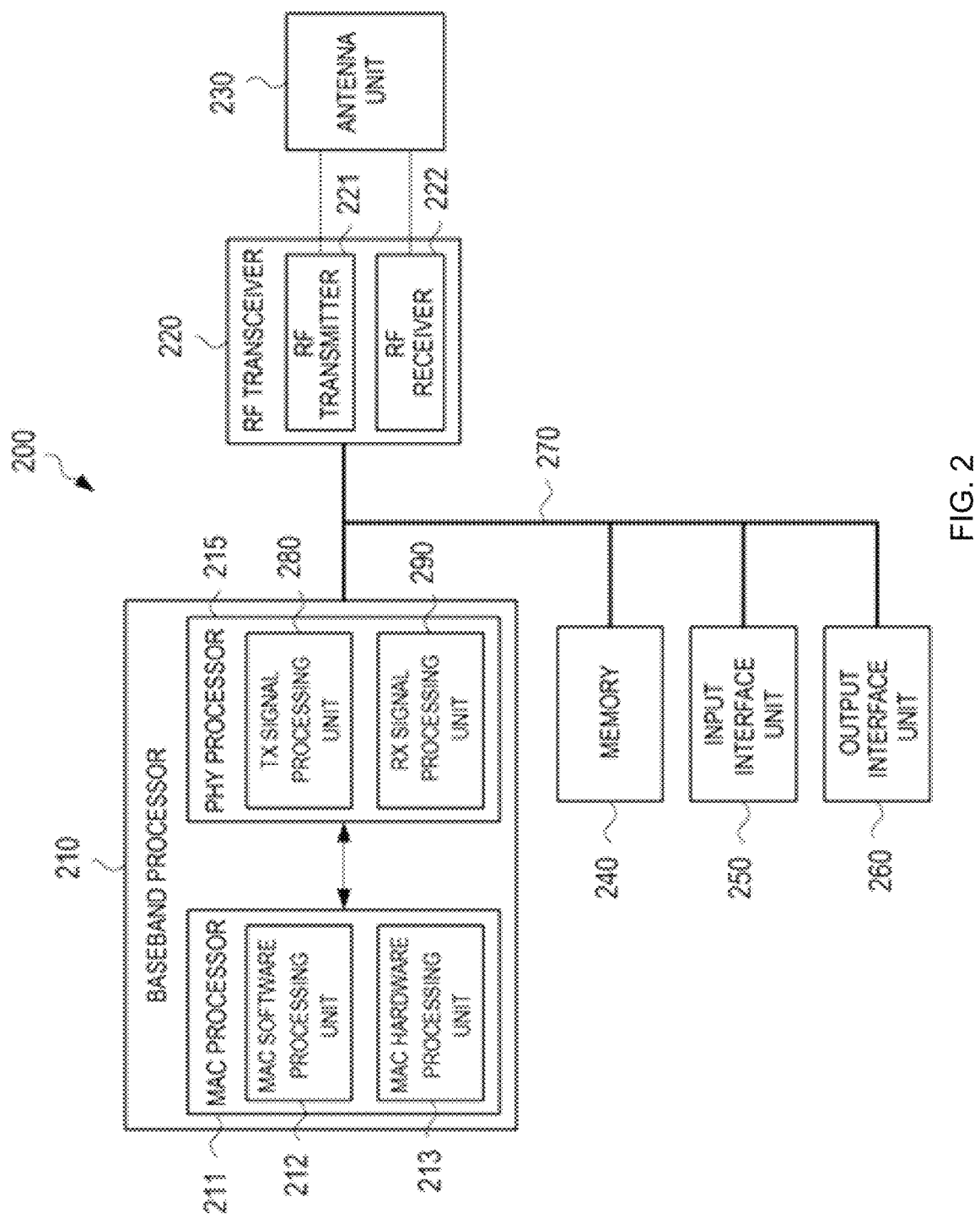
FIG. 2 illustrates a schematic diagram of an exemplary wireless communication device, according to some aspects of the disclosure.

FIG. 2 illustrates a schematic diagram of an exemplary wireless communication device, according to some aspects of the disclosure. The wireless communication device 200 can be a client device, e.g., client devices 112A-115A and 112B-115B, a network device, e.g., network devices 111A and 111B, or a network controller. The wireless communication device 200 includes a baseband processor 210, a radio frequency (RF) transceiver 220, an antenna unit 230, a memory 240, an input interface unit 250, an output interface unit 260, and a bus 270, or subsets and variations thereof. The wireless communication device 200 can be, or can be a part of, any of the network devices 111A or 111B.

In the example, the baseband processor 210 performs baseband signal processing, and includes a medium access control (MAC) processor 211 and a PHY processor 215. The memory 240 may store software (such as MAC software) including at least some functions of a MAC layer. The memory may further store an operating system and applications.

In the illustration, the MAC processor 211 includes a MAC software processing unit 212 and a MAC hardware processing unit 213. The MAC software processing unit 212 executes the MAC software to implement some functions of the MAC layer, and the MAC hardware processing unit 213 may implement remaining functions of the MAC layer as hardware (MAC hardware). However, the MAC processor 211 may vary in functionality depending on implementation. The PHY processor 215 includes a transmitting (TX) signal processing unit 280 and a receiving (RX) signal processing unit 290. The term TX may refer to transmitting, transmit, transmitted, transmitter or the like. The term RX may refer to receiving, receive, received, receiver or the like.

The PHY processor 215 interfaces to the MAC processor 211 through, among others, transmit vector (TXVECTOR) and receive vector (RXVECTOR) parameters. In some aspects, the MAC processor 211 generates and provides TXVECTOR parameters to the PHY processor 215 to supply per-packet transmit parameters. In some aspects, the PHY processor 215 generates and provides RXVECTOR parameters to the MAC processor 211 to inform the MAC processor 211 of the received packet parameters.

In some aspects, the wireless communication device 200 includes a read-only memory (ROM) (not shown) or registers (not shown) that store instructions that are needed by one or more of the MAC processor 211, the PHY processor 215 and/or other components of the wireless communication device 200.

In some embodiments, the wireless communication device 200 includes a permanent storage device (not shown) configured as a read-and-write memory device. The permanent storage device may be a non-volatile memory unit that stores instructions even when the wireless communication device 200 is off. The ROM, registers and the permanent storage device may be part of the baseband processor 210 or be a part of the memory 240. Each of the ROM, the permanent storage device, and the memory 240 may be an exemplary memory or a computer-readable medium. A memory may be one or more memories.

The memory 240 may be a read-and-write memory, a read-only memory, a volatile memory, a non-volatile memory, or a combination of some or all of the foregoing. The memory 240 may store instructions that one or more of the MAC processor 211, the PHY processor 215, and/or another component may need at runtime.

The RF transceiver 220 includes an RF transmitter 221 and an RF receiver 222. The input interface unit 250 receives information from a client device, and the output interface unit 260 outputs information to the client device. The antenna unit 230 includes one or more antennas. When multi-input multi-output (MIMO) or multi-user MIMO (MU-MIMO) is used, the antenna unit 230 may include more than one antenna.

The bus 270 collectively represents all system, peripheral, and chipset buses that communicatively connect the numerous internal components of the wireless communication device 200. In some embodiments, the bus 270 communicatively connects the baseband processor 210 with the memory 240. From the memory 240, the baseband processor 210 may retrieve instructions to execute and data to process in order to execute the processes of the subject disclosure. The baseband processor 210 can be a single processor, multiple processors, or a multi-core processor in different embodiments. The baseband processor 210, the memory 240, the input interface unit 250, and the output interface unit 260 may communicate with each other via the bus 270.

The bus 270 also connects to the input interface unit 250 and the output interface unit 260. The input interface unit 250 enables a user to communicate information and select commands to the wireless communication device 200. Input devices that may be used with the input interface unit 250 may include any acoustic, speech, visual, touch, tactile and/or sensory input device, e.g., a keyboard, a pointing device, a microphone, or a touchscreen. The output interface unit 260 may enable, for example, the display or output of videos, images, audio, and data generated by the wireless communication device 200. Output devices that may be used with the output interface unit 260 may include any visual, auditory, tactile, and/or sensory output device, e.g., printers and display devices or any other device for outputting information. Some embodiments may include devices that function as both input and output devices, such as a touchscreen.

Some embodiments can be realized in part or in whole using a computer-readable medium. In one aspect, a computer-readable medium includes one or more media. In some aspects, a computer-readable medium is a tangible computer-readable medium, a computer-readable storage medium, a non-transitory computer-readable medium, a machine-readable medium, a memory, or some combination of the foregoing (e.g., a tangible computer-readable storage medium, or a non-transitory machine-readable storage medium). In some aspects, a computer is a machine. In some aspects, a computer-implemented method is a machine-implemented method.

A computer-readable medium may include storage integrated into a processor and/or storage external to a processor. A computer-readable medium may be a volatile, non-volatile, solid state, optical, magnetic, and/or other suitable storage device, e.g., RAM, ROM, PROM, EPROM, a flash, registers, a hard disk, a removable memory, or a remote storage device.

In one aspect, a computer-readable medium comprises instructions stored therein. In one aspect, a computer-readable medium is encoded with instructions. In one aspect, instructions are executable by one or more processors (e.g., 210, 211, 212, 213, 215, 280, 290) to perform one or more operations or a method. Instructions may include, for example, programs, routines, subroutines, data, data structures, objects, sequences, commands, operations, modules, applications, and/or functions. Those skilled in the art would recognize how to implement the instructions.

A processor (e.g., 210, 211, 212, 213, 215, 280, 290) may be coupled to one or more memories (e.g., one or more external memories such as the memory 240, one or more memories internal to the processor, one or more registers internal or external to the processor, or one or more remote memories outside of the wireless communication device 200), for example, via one or more wired and/or wireless connections. The coupling may be direct or indirect. In one aspect, a processor includes one or more processors. A processor, including a processing circuitry capable of executing instructions, may read, write, or access a computer-readable medium. A processor may be, for example, an application specific integrated circuit (ASIC), a digital signal processor (DSP), or a field programmable gate array (FPGA).

In one aspect, a processor (e.g., 210, 211, 212, 213, 215, 280, 290) is configured to cause one or more operations of the subject disclosure to occur. In one aspect, a processor is configured to cause an apparatus (e.g., wireless communication device 200) to perform operations or a method of the subject disclosure. In some embodiments, a processor configuration involves having a processor coupled to one or more memories. A memory may be internal or external to the processor. Instructions may be in a form of software, hardware or a combination thereof. Software instructions (including data) may be stored in a memory. Hardware instructions may be part of the hardware circuitry components of a processor. When the instructions are executed or processed by one or more processors, (e.g., 210, 211, 212, 213, 215, 280, 290), the processors cause one or more operations of the subject disclosure to occur or cause an apparatus (e.g., wireless communication device 200) to perform operations or a method of the subject disclosure.

Figure 3A:
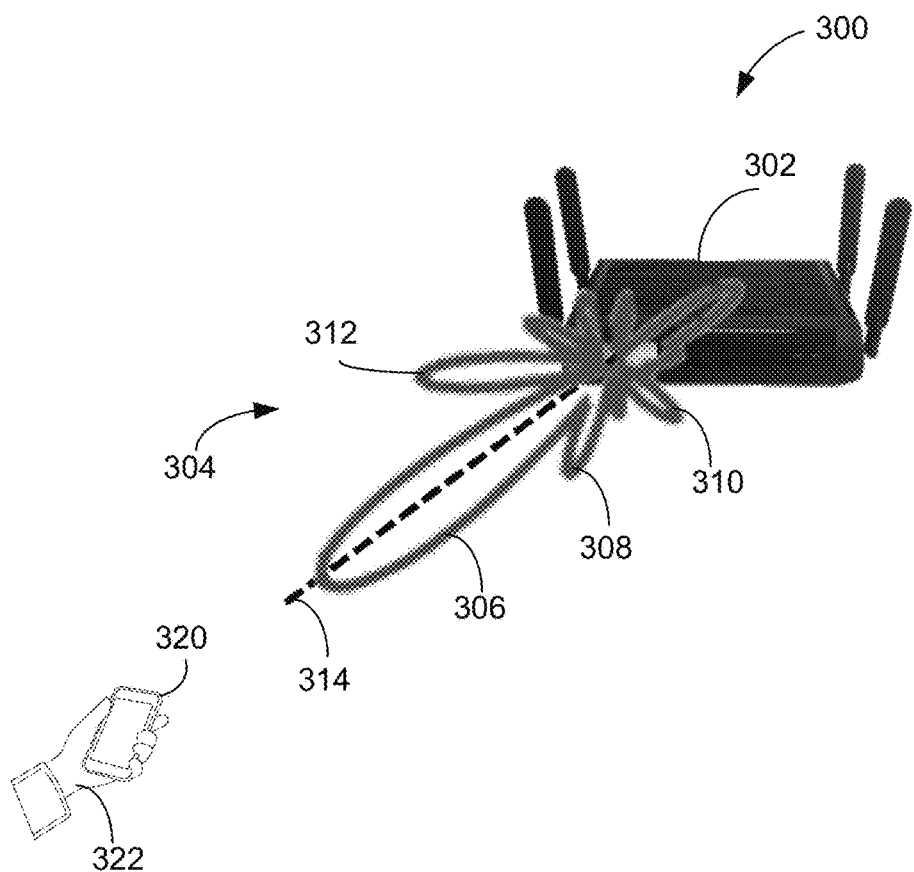
FIG. 3A illustrates a schematic diagram of an exemplary network device of a wireless communication system, according to some aspects of the disclosure.

FIG. 3A illustrates a schematic diagram of an exemplary network device of a wireless communication system, according to some aspects of the disclosure. In some embodiments, the wireless communication system is consistent with a wireless communication network that includes two or more wireless communication subnetworks as shown in FIG. 1. As shown in FIG. 3A, diagram 300 includes network device 302 that is consistent with network devices 111A and 111B of FIG. 1. In some embodiments, network device 302 includes a phased-array antenna that generates beamforming pattern 304. Beamforming pattern 304 may include a plurality of lobes that include main lobe 306 and side lobes 308, 310, and 312. Beamforming pattern 304 may be used for directing energy of a signal to be transmitted by network device 302 towards a predefined direction. In some examples, a signal is transmitted in direction 314 of main lobe 306 that may have a highest energy compared to other signals transmitted in the directions of other lobes. In some embodiments, network device 302 transmits a signal in direction 314 of the main lobe to client device 320 of user 322 and client device 320 receives the transmitted signal of network device 302. Conversely, network device 302 may use beamforming pattern 304 for receiving signals. In some examples, a signal is received in direction 314 of main lobe 306. In addition, other signals may be received in directions of other lobes 308, 310, and 312. Network device 302 may use main lobe 306 for directional receiving of signals.

Figure 3B:
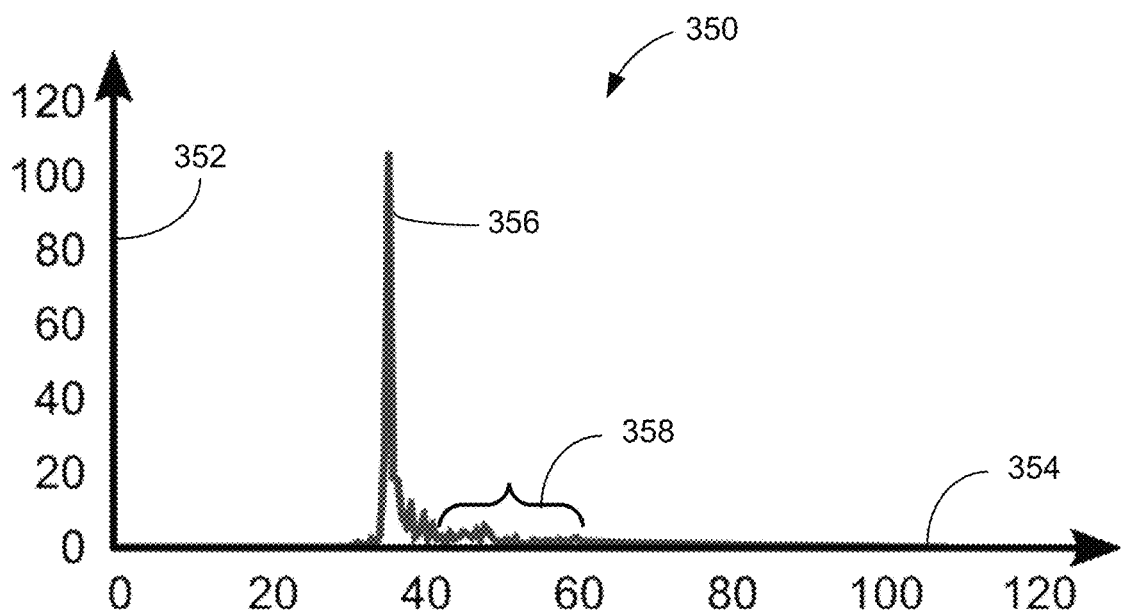
FIG. 3B illustrates a graph of an exemplary channel impulse response signal, according to some aspects of the disclosure.

FIG. 3B illustrates a graph of an exemplary channel impulse response signal, according to some aspects of the disclosure. As shown in FIG. 3B, graph 350 may show a received signal by network device 302 from client device 320. In some examples, client device 320 has transmitted a pulse, e.g., a burst, and graph 350 shows the signal received by network device through main lobe 306. The received signal is displayed as amplitude versus time. The amplitude is displayed on coordinate 352 with arbitrary units and time is displayed on coordinate 354 as nanoseconds in the example illustrated in FIG. 3B. However, other metrics or units may be used. Graph 350 includes peak 356 and tail 358. In some examples, tail 358 may be caused by measurement noise and thus may not be recognizable. In some examples, the received signal may be a noise signal and thus may be cleaned by signal processing and filtering. Additionally, a time of peak 356 on coordinate 354 may be a time delay from sending a signal by network device 302 through main lobe 306 to client device 320 and receiving a response from client device 320 through main lobe 306.

Figure 4A:
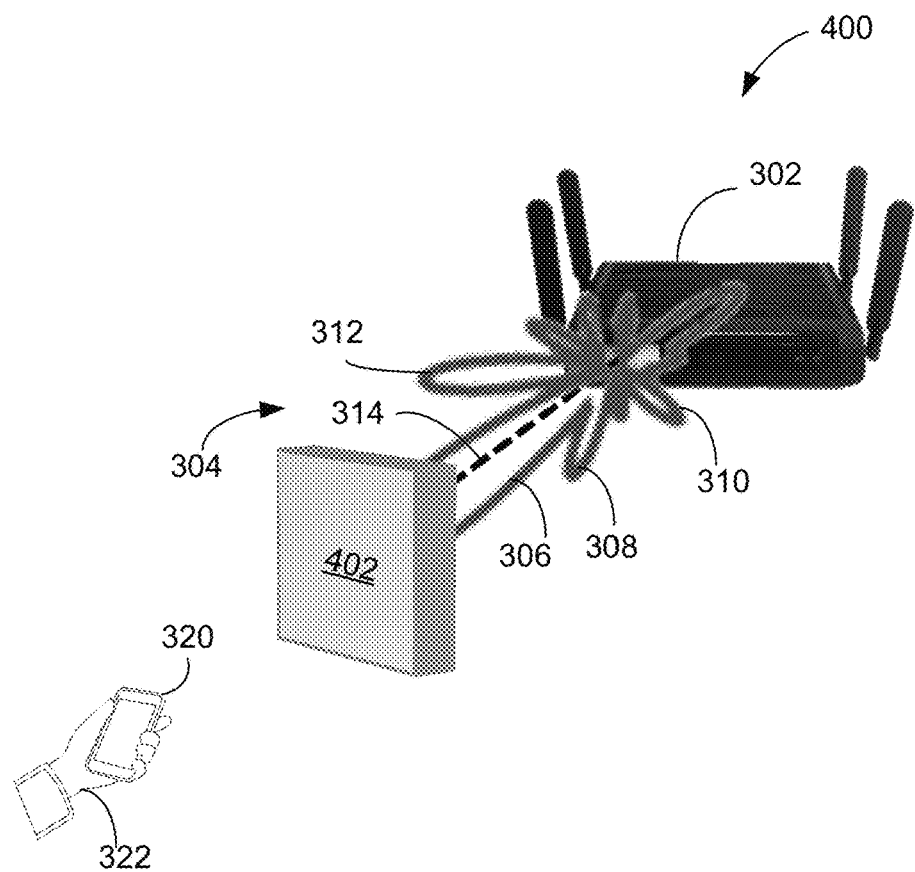
FIG. 4A illustrates a schematic diagram of an exemplary network device of a wireless communication system, according to some aspects of the disclosure.

FIG. 4A illustrates a schematic diagram of an exemplary network device of a wireless communication system, according to some aspects of the disclosure. As shown in FIG. 4A, diagram 400 includes network device 302 of FIG. 3A that generates beamforming pattern 304. In some embodiments, FIG. 4A is consistent with FIG. 3A with the exception that main lobe 306 of beamforming pattern 304 is blocked by object 402 and a signal transmitted by client device 320 does not reach network device 302 through main lobe 306. Additionally, client device 320 is not in directions of the side lobes and thus network device 302 may not receive a signal through the side lobe. In some examples, an object is a human body, an appliance, a wall, or any material that blocks signal transmission between a network device and a client device.

Figure 4B:
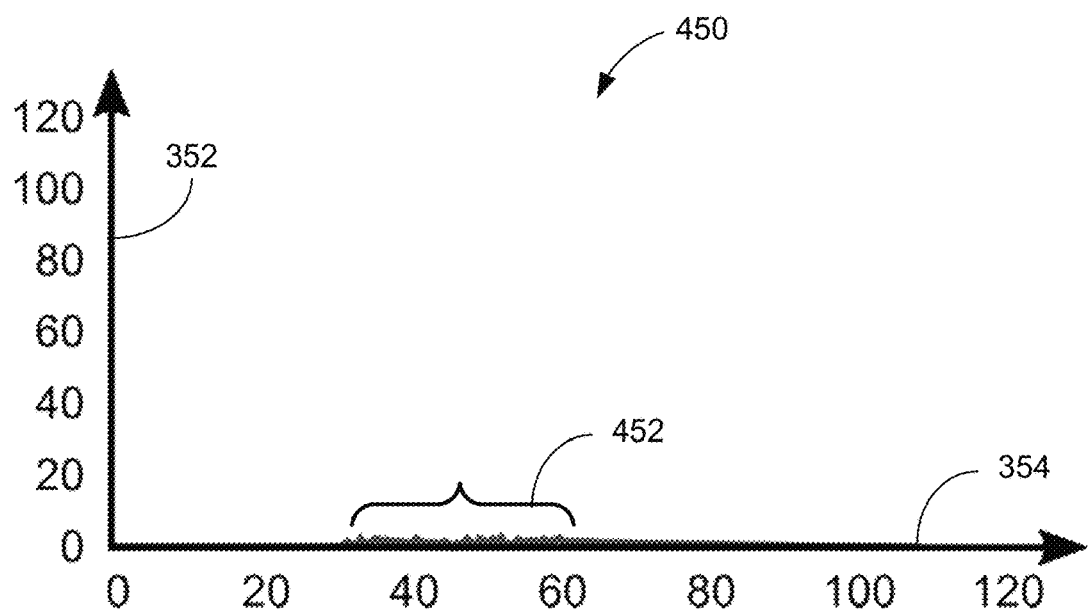
FIG. 4B illustrates a graph of an exemplary channel impulse response signal, according to some aspects of the disclosure.

FIG. 4B illustrates a graph of an exemplary channel impulse response signal, according to some aspects of the disclosure. As shown in FIG. 4B, graph 450 may show a received signal by network device 302 from client device 320. As discussed network device 302 may not receive a signal through the main lobe or the side lobes and thus the displayed signal 452 is measurement noise and thus may not be recognizable.

Figure 5A:
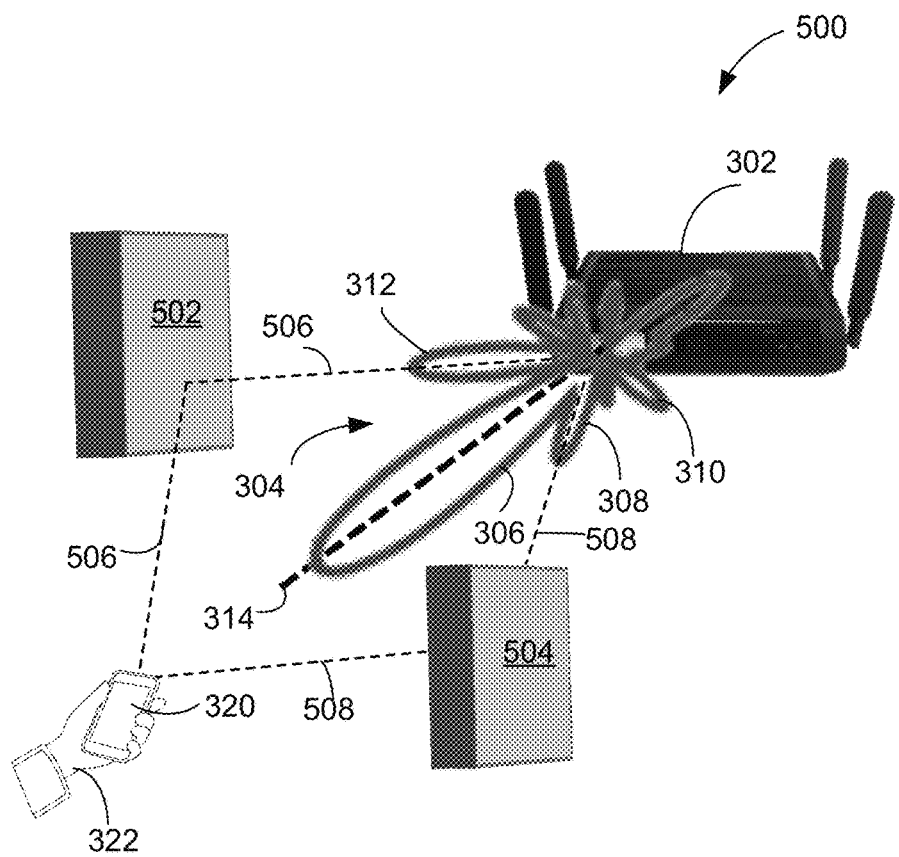
FIG. 5A illustrates a schematic diagram of exemplary network device of a wireless communication system, according to some aspects of the disclosure.

FIG. 5A illustrates a schematic diagram of an exemplary network device of a wireless communication system, according to some aspects of the disclosure. As shown in FIG. 5A, diagram 500 includes network device 302 of FIG. 3A that generates beamforming pattern 304. In some embodiments, FIG. 5A is consistent with FIG. 3A with the exception that objects 502 and 504 are located in directions of side lobes of beamforming patterns 304 between client device 320 and network device 302. In some embodiments, a signal transmitted by client device 320, in direction 508, may bounce from object 504 and may be received by network device 302 through side lobe 308. Alternatively, a signal transmitted by client device 320, in direction 506, may bounce from object 502 and may be received by network device 302 through side lobe 312. Thus, network device 302 may receive three signals from client device 320, a first signal through main lobe 306 as discussed with respect to FIG. 3A, and two more signals through side lobes 308 and 312.

Figure 5B:
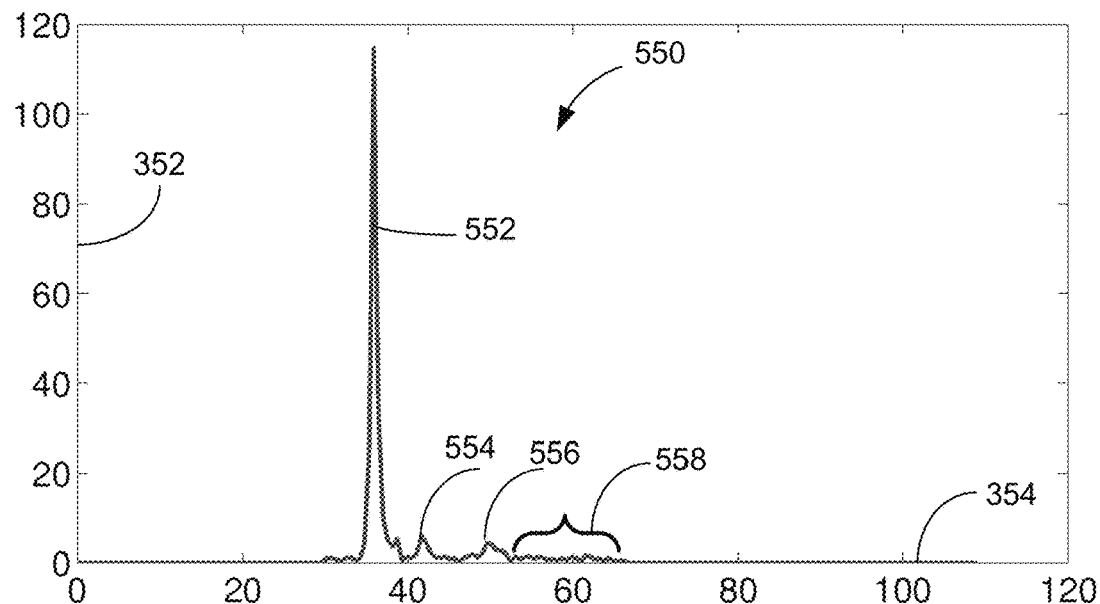
FIG. 5B illustrates a graph of an exemplary channel impulse response signal, according to some aspects of the disclosure.

FIG. 5B illustrates a graph of an exemplary channel impulse response signal, according to some aspects of the disclosure. As shown in FIG. 5B, graph 550 may show a received signal by network device 302 from client device 320. In some examples, client device 320 transmits a pulse, e.g., a burst, and graph 550 shows the signal received by network device through main lobe 306 and side lobes 308 and 312. Graph 550 includes main peak 552, e.g., highest peak, received through main lobe 306, a second peak 554 received through side lobe 312, and a third peak 556 received through side lobe 308. Graph 550 also shows tail 558 that may be caused by measurement noise and thus may not be recognizable. In some examples, a time on coordinate 354 corresponds to a time from the instance a pulse is transmitted by network device 302 to client device until a response is received by network device 302 from client device 320. Additionally, a time of peak 552 on coordinate 354 may correspond to a time delay from sending a signal by network device 302 through main lobe 306 to client device 320 and receiving a response from client device 320 through main lobe 306. A time of peak 554 on coordinate 354 may correspond to a time delay from sending a signal by network device 302 through main lobe 306 to client device 320 and receiving a response from client device 320 through side lobe 312 after bouncing from object 502. A time of peak 556 on coordinate 354 may correspond to a time delay from sending a signal by network device 302 through main lobe 306 to client device 320 and receiving a response from client device 320 through side lobe 308 after bouncing from object 504.

In some examples, network device 302 receives three or more signals, e.g., five signals, and the channel impulse response signal may include three or more, e.g., five, peaks. A first peak that may be the strongest peak is received from client device 320 through the main lobe and with shortest delay. Two or more other peaks are received through side lobes when the transmitted signal from client device 320 bounces on two or more objects and is redirected to the two or more side lobes. The signals received through the side lobes may suffer more delays compared to the signal received through the main lobe. In some embodiments, client device 320 may use beamforming and may directionally transmit a signal to the main lobe or side lobes (via bouncing) of network device 302.

Figure 6A:
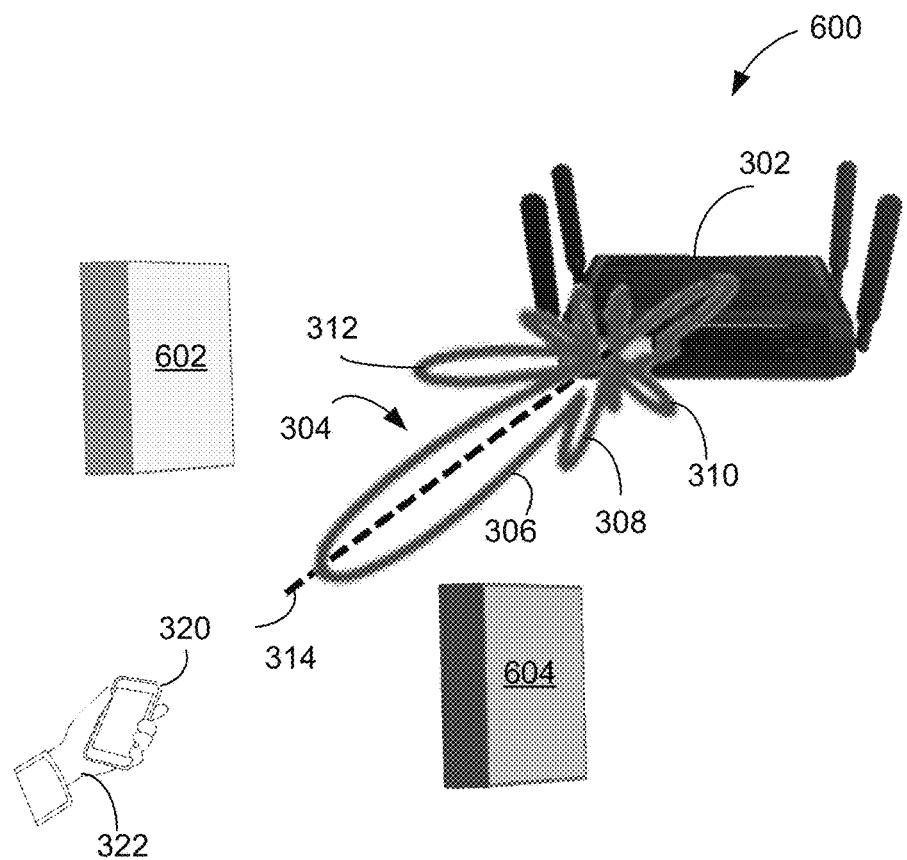
FIG. 6A illustrates a schematic diagram of exemplary network device of a wireless communication system, according to some aspects of the disclosure.

FIG. 6A illustrates a schematic diagram of an exemplary network device of a wireless communication system, according to some aspects of the disclosure. As shown in FIG. 6A, diagram 600 includes network device 302 of FIG. 3A that generates beamforming pattern 304. In some embodiments, FIG. 6A is consistent with FIG. 5A with the exception that object 602 is made of a metallic material but object 604 is made of a non-metallic material similar to object 504 of FIG. 5A. In some examples, objects made of metallic material, compared to objects made of non-metallic material, are better reflectors. In addition, similar to FIG. 5A, objects 602 and 604 are located in direction of side lobes of beamforming patterns 304 between client device 320 and network device 302. Object 602 may cause a stronger bouncing and thus the signal received by network device 302 through side lobe 312 becomes stronger while the signal received by network device 302 through side lobe 308 may stay similar to the same signal in FIG. 5A. Thus, network device 302 may receive three signals from client device 320, a first signal through main lobe 306 that is similar to the same signal in FIG. 5A, a second signal though side lobe 312 that is stronger than the same signal in FIG. 5A and a third signal through side lobes 308 that is similar to the same signal in FIG. 5A.

Figure 6B:
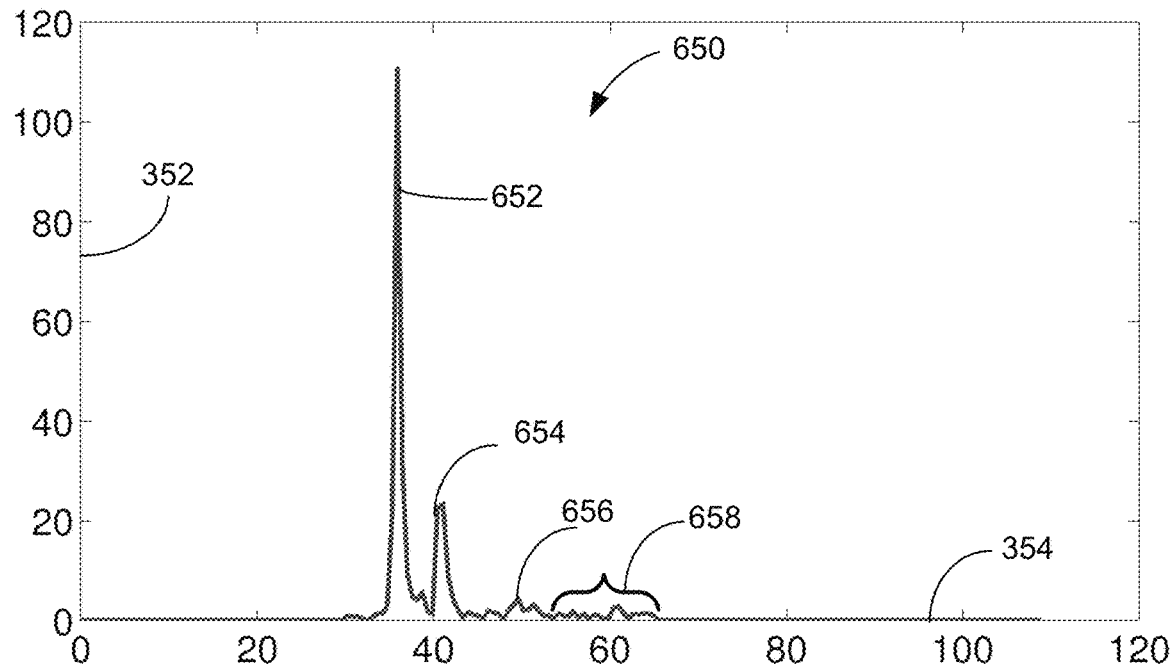
FIG. 6B illustrates a graph of an exemplary channel impulse response signal, according to some aspects of the disclosure.

FIG. 6B illustrates a graph of an exemplary channel impulse response signal, according to some aspects of the disclosure. As shown in FIG. 6B, graph 650 may show a received signal by network device 302 from client device 320. In some examples, client device 320 has transmitted a pulse, e.g., a burst, and graph 650 shows the signals received by network device through main lobe 306 and side lobes 308 and 312. Graph 650 includes main peak 652 received through main lobe 306, a second peak 654 received through side lobe 312, and a third peak 656 received through side lobe 308. Graph 650 also shows tail 658 that may be caused by measurement noise and thus may not be recognizable. As shown, graph 650 is similar to graph 550 of FIG. 5B with the exception that peak 654 caused by bouncing through metallic reflector object 602 is much stronger than peak 554 of FIG. 5B.

Figure 7A:
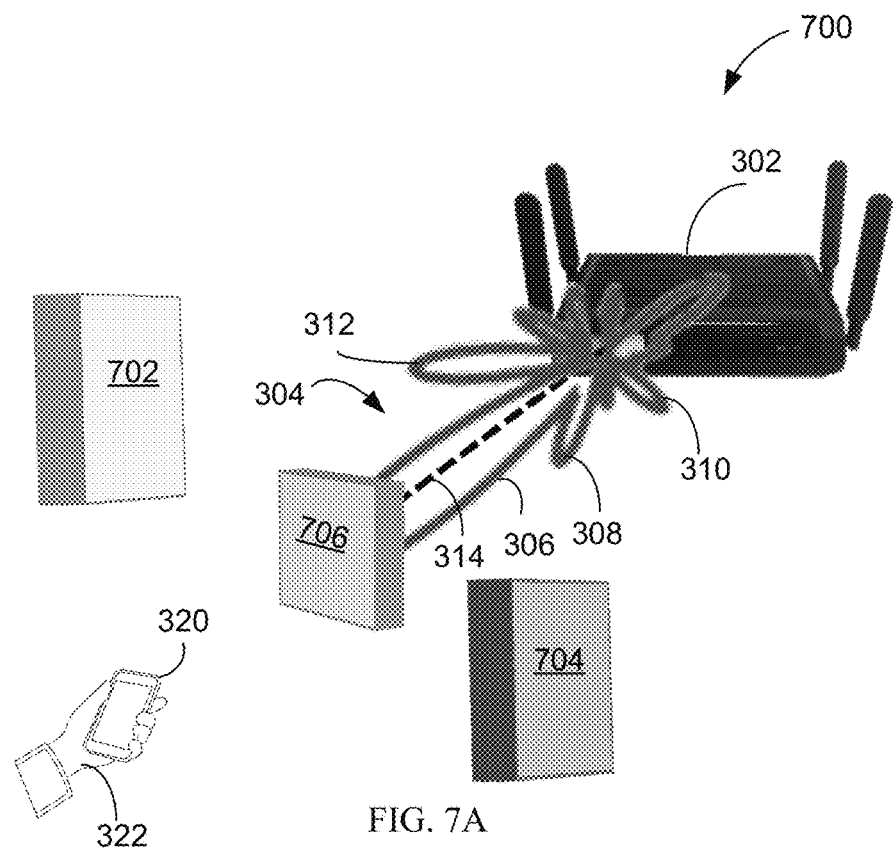
FIG. 7A illustrates a schematic diagram of an exemplary network device of a wireless communication system, according to some aspects of the disclosure.

FIG. 7A illustrates a schematic diagram of an exemplary network device of a wireless communication system, according to some aspects of the disclosure. As shown in FIG. 7A, diagram 700 includes network device 302 of FIG. 3A that generates beamforming pattern 304. In some embodiments, FIG. 7A is consistent with FIG. 6A with the exception that main lobe 306 of beamforming pattern 304 is blocked by object 706 and a signal transmitted by client device 320 does not reach network device 302 through main lobe 306. Similar to FIG. 6A, object 702 is made of a metallic material but object 704 is of a non-metallic material similar to object 504 of FIG. 5A. In addition, similar to FIG. 5A, objects 702 and 704 are located in direction of side lobes of beamforming patterns 304 between client device 320 and network device 302. Object 702 may cause a strong bouncing similar to FIG. 6A and thus the signal received by network device 302 through side lobe 312 becomes stronger than the same signal in FIG. 5A. The signal received by network device 302 through side lobe 308 may stay similar to the same signal in FIG. 5A. Thus, network device 302 may receive two signals from client device 320, a first signal though side lobe 312 that is stronger than the same signal in FIG. 5A and a second signal through side lobes 308 that is similar to the same signal in FIG. 5A. Network device 302 may not receive a signal through main lobe 306.

Figure 7B:
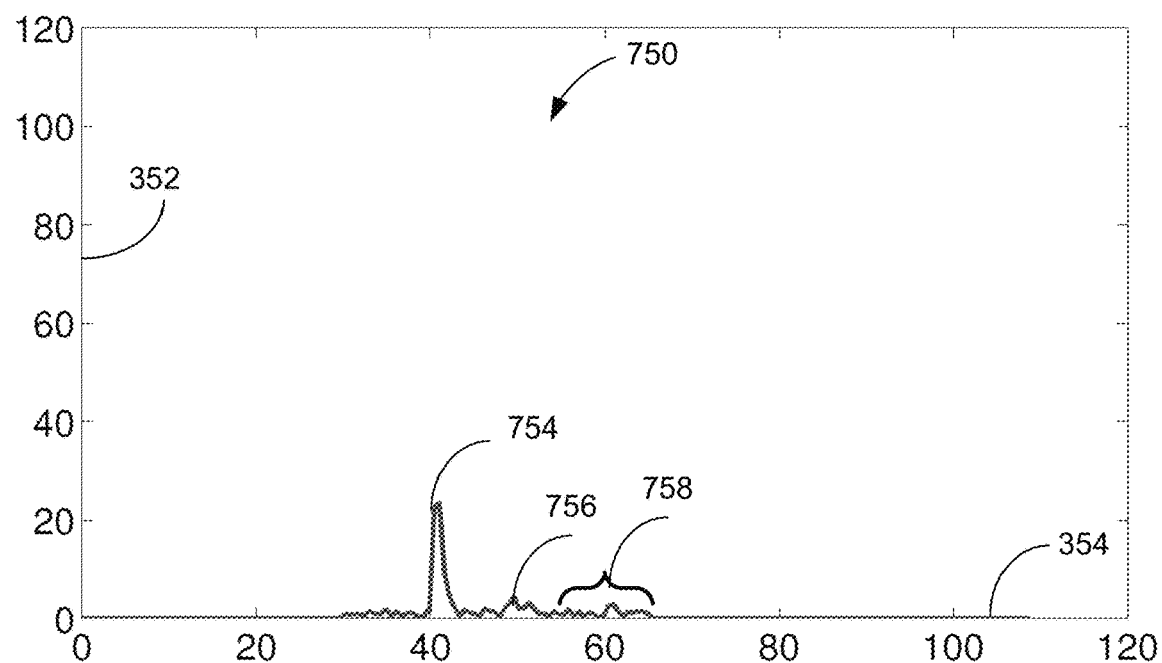
FIG. 7B illustrates a graph of an exemplary channel impulse response signal, according to some aspects of the disclosure.

FIG. 7B illustrates a graph of an exemplary channel impulse response signal, according to some aspects of the disclosure. As shown in FIG. 7B, graph 750 may show a received signal by network device 302 from client device 320. In some examples, client device 320 has transmitted a pulse, e.g., a burst, and graph 750 shows the signals received by network device through side lobes 308 and 312. Graph 750 includes a first peak 754 received through side lobe 312 and a second peak 756 received through side lobe 308. Graph 750 also shows tail 758 that may be caused by measurement noise and thus may not be recognizable. As shown, graph 750 is similar to graph 650 of FIG. 5B with the exception that peak 652 received through main lobe 306 does not exist. In some embodiments, a time of peak 754 on coordinate 354 may be a time delay from sending a signal by network device 302 through side lobe 312 and bouncing via object 702 and to client device 320 and receiving a response from client device 320 through side lobe 312 after bouncing from object 702. A time of peak 756 on coordinate 354 may be a time delay from sending a signal by network device 302 through side lobe 312 and bouncing via object 702 to client device 320 and receiving a response from client device 320 through side lobe 308 after bouncing from object 704.

Figure 8:
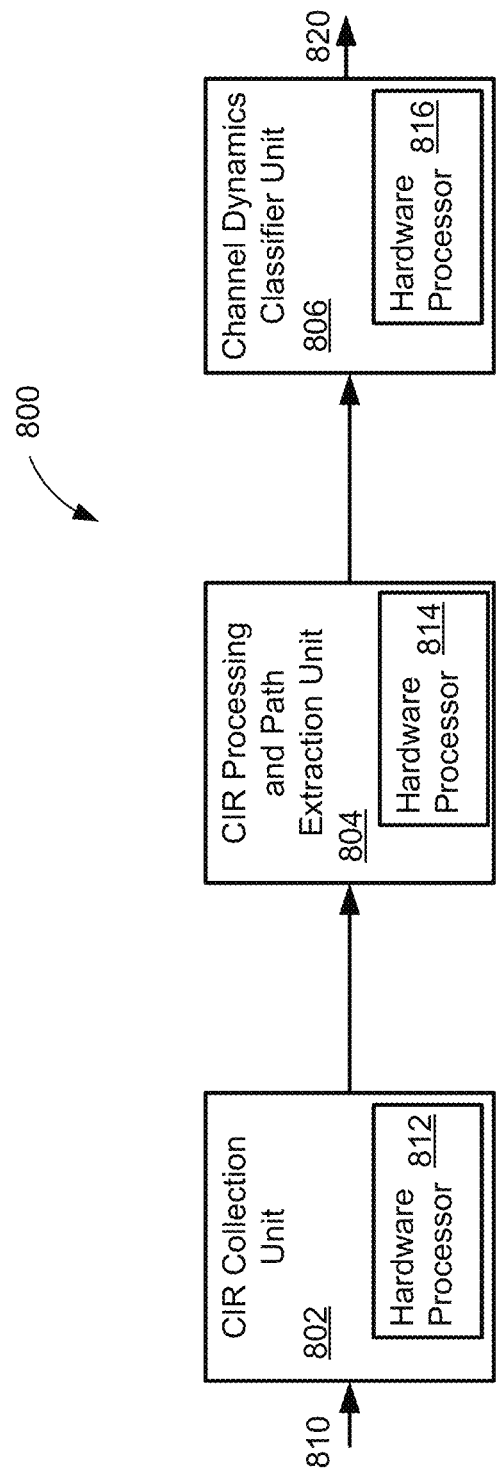
FIG. 8 illustrates a schematic diagram of an exemplary processing system, according to some aspects of the disclosure.

FIG. 8 illustrates a schematic diagram of an exemplary processing system, according to some aspects of the disclosure. Processing system 800 of FIG. 8 may be included in a network controller and may comprise channel impulse response (CIR) collection unit 802, CIR processing and path extraction unit 804, and channel dynamics classifier unit 806. In some examples, CIR collection unit 802 of network controller may include hardware processor 812. Hardware processor 812 of the CIR collection unit may request network device 302 of FIG. 3A for the channel impulse response signals corresponding to one or more client devices that are in communication with network device 302. Network device 302 may send a current channel impulse response signal corresponding to the client devices or may retrieve past channel impulse response signals of the client devices from a memory and send the current and past channel impulse response signals to CIR collection unit 802.

In some embodiments, CIR collection unit 802 may receive the channel impulse response signals of the client devices from network device 302 and may send the channel impulse response signals to CIR processing and path extraction unit 804. CIR processing and path extraction unit 804 may include hardware processor 814. Hardware processor 814 of the CIR processing and path extraction unit may process the channel impulse response signals. Processing channel impulse response signals may include filtering and may further include noise reduction. CIR processing and path extraction unit 804 may use the processed channel impulse response signals of the client devices that are in communication with network device 302 and may generate path data. The path data may define one or more paths, e.g., transmission paths that exist between each client device and the network device. The path data also defines an amplitude for each received signal from each path. Thus, the path data may comprise one or more paths with an amplitude level and a time delay attributed to each path. The amplitude level may be proportional to a signal that may be received through the path.

In some embodiments, the path data is sent to channel dynamics classifier unit 806 for classification. The channel dynamics classifier unit may include hardware processor 816. By comparing the path data of a communication channel between a client device and the network device at different instances of time, it may be determined that the communication link between the client device and the network device is altered. The classification is defined in more details with respect to FIG. 9. The comparison and the classification may be performed by hardware processor 816.

In some embodiments, network device 302 continuously determines channel impulse response signals of the client device 320 at predetermined time intervals, e.g., every 10 milliseconds to 100 milliseconds. Network device 302 may further store the determined channel impulse response signals in a memory of network device 302. In some examples, network device 302 may transfer the channel impulse response signals to a network controller to be stored by the network controller. In some embodiments, network device 302 retrieves channel impulse response signals corresponding to client device 320 from memory, processes the channel impulse response signals, and determines the path data based on the processed channel impulse response signals. In some embodiments, the network controller retrieves channel impulse response signals corresponding to client device 320 from memory, processes the channel impulse response signals, and determines the path data based on the processed channel impulse response signals.

In some embodiments, network device 302 determines a current channel impulse response signal and retrieves past channel impulse response signals as a time-based signal. Network device 302 may further determine a current path data and one or more past path data based on corresponding time-based channel impulse response signals. Alternatively, network device 302 determines a frequency-based signal and then determines the channel impulse response signal by inverse Fourier transforming the frequency-based signal. In some embodiments, determining the current path data and the past path data includes determining a primary path and one or more secondary paths between client device 320 and network device 302. The primary path may correspond to transmissions via the main lobe of beamforming pattern 304 and secondary paths may correspond to transmissions via side lobes of beamforming pattern 304. In some embodiments, the primary path corresponds to a highest peak with a shortest time delay in the path data that correspond to transmission via the main lobe of beamforming pattern 304. In some examples, the main lobe may be blocked between network device 302 and client device 320 and thus the primary path may not exist is a path data and the path data may include one or more secondary paths. In some examples as shown in FIG. 4B, transmissions via the main lobe or the side lobes of beamforming pattern 304 may not reach client device 320. Thus, the path data may not include a recognizable peak and may not include a primary path or a secondary path.

Figure 9:
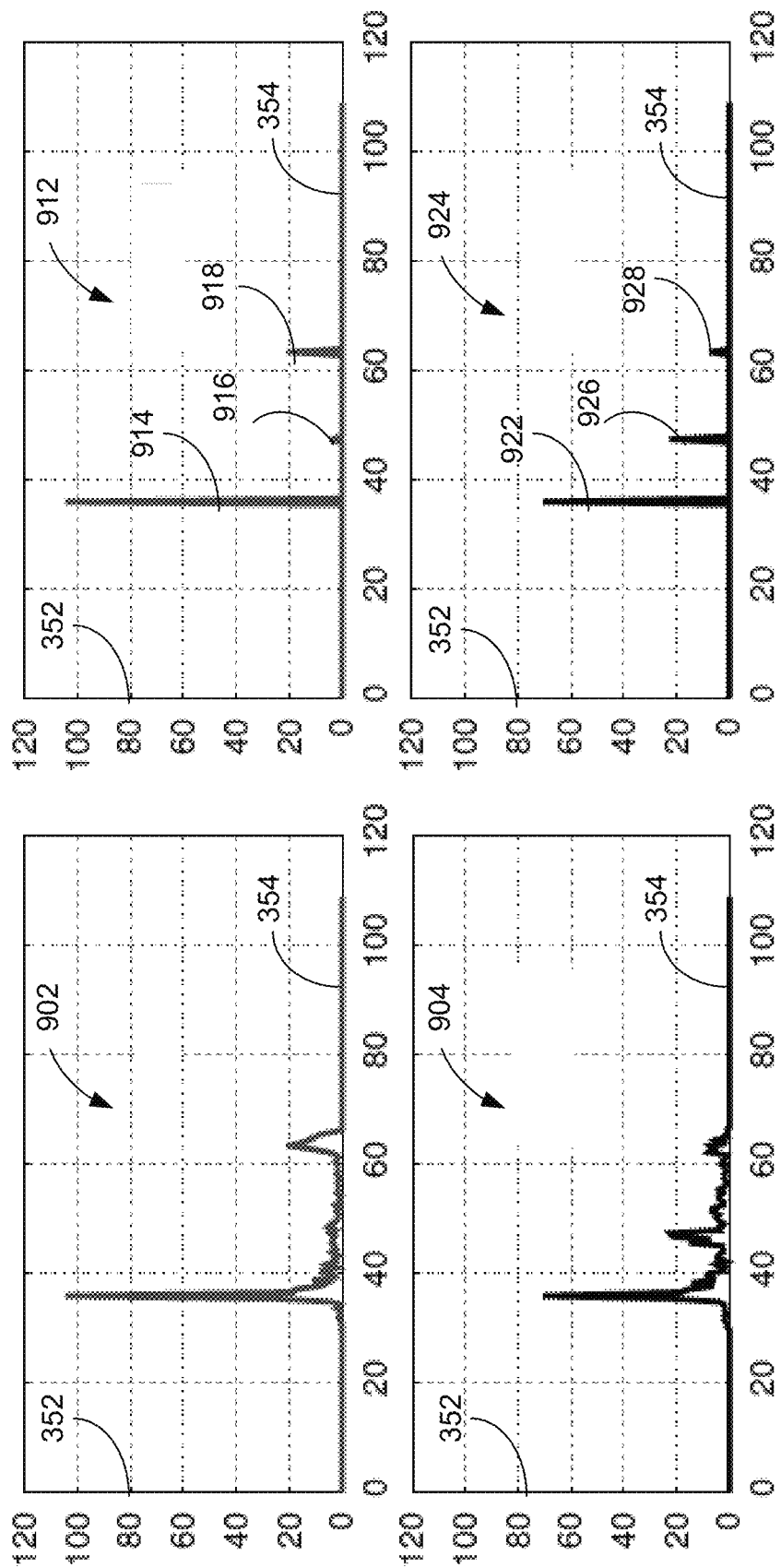
FIG. 9 illustrates graphs of exemplary channel impulse response signals and path data, according to some aspects of the disclosure.

FIG. 9 illustrates graphs of exemplary channel impulse response signals and path data, according to some aspects of the disclosure. Graph 902 of FIG. 9 illustrates a channel impulse response signal and graph 912 illustrates path data corresponding to graph 902. As shown in graph 912, there are three peaks 914, 916, and 918 corresponding to channel impulse response signal of graph 902. As shown, channel impulse response signal is filtered and cleaned and the three peaks are extracted. In some examples, peak 914 with the highest amplitude corresponds to a main lobe and peaks 916 and 918 correspond to two side lobes that include bouncing (e.g., reflection) of the signals from objects 502/602 and 504/604 as shown in FIGS. 5A and 6A. In some examples, peak 918 with higher amplitude compared to peak 916 corresponds to bouncing of the signal from a metallic object and peak 916 corresponds to bouncing of the signal from a non-metallic object. In some examples, peak 918 with a longer time delay corresponds to a longer path between the client device and the network device compared to peak 916. In some embodiments, processing system 800 is included in the network device and CIR collection unit 802, CIR processing and path extraction unit 804, and channel dynamics classifier unit 806 function in the network device and store the path data in the network device. Thus, the network device may adjust the communication links between the network device and the client devices coupled to the network device, based on the path data. In some examples, the communication system may include two or more network devices and the network devices may transmit the path data to the network controller. The network controller and/or the network devices may adjust the communication links.

Graph 904 of FIG. 9 illustrates a channel impulse response signal and graph 924 illustrates path data corresponding to graph 904. As shown in graph 924, there are three peaks 922, 926, and 928 corresponding to channel impulse response signal of graph 904. As shown, channel impulse response signal is filtered and cleaned and the three peaks are extracted. In some examples, peak 922 with the highest amplitude corresponds to a main lobe and peaks 926 and 928 correspond to two side lobes that include bouncing (e.g., reflection) of the signals from objects 502/602 and 504/604 as shown in FIGS. 5A and 6A. In some examples, peak 926 with a higher amplitude compared to peak 928 corresponds to bouncing of the signal from a metallic object and peak 928 corresponds to bouncing of the signal from a non-metallic object as shown in FIG. 6B. In some examples, peak 928 with a longer time delay corresponds to a longer path between the client device and the network device compared to peak 926.

In some examples, a motion of the client device is detected if First: a number of peaks in the path data is changed or an amplitude of a peak in the path data is changed by more than a predefined threshold value, and Second: the first condition is satisfied for a predefined period. Otherwise, if the second condition is not met, an object may have temporarily moved between the client device and the network device and may have blocked the main lobe or one or more of the side lobes.

In some embodiments, network device 302 determines that it is physically blocked from client device 320 when in the current path data the primary path disappears. The disappearance may be determined by comparing the primary path of the current path data to one or more past path data corresponding to a time instances prior to (e.g., immediately prior to) a current time instance. In some examples, client device 320 may move further from network device 302 and a peak corresponding to the primary path may become less strong.

In some embodiments, communication between network device 302 and client device 320 changes by selecting a different beamforming pattern from a plurality of beamforming patterns that are pre-configured for network device 302. In some examples, by selecting a different beamforming pattern for network device 302, the primary path in the path data reappears. In some examples, selecting the plurality of beamforming patterns for network device 302, does not bring back the primary path in the path data and a network controller of the communication system may determine to hand off the client device to a second and different network device. In some embodiments, network device 302 is configured with the plurality of beamforming patterns 304 such that each beamforming pattern may steer the main lobe 306 and provide directional transmission beams at different angles. Alternatively, the plurality of beamforming pattern of network device 302 may provide directional receiving of signals. In some examples, network device 302 may select one or more different beamforming patterns and may determine if changing to a different beamforming pattern has caused the primary path to reappear in the path data. In some examples, network device 302 informs the network controller of an outcome of using a different beamforming pattern.

In some embodiments, a number of paths are determined between the client device 320 and the network device 302 in a path data such as path data shown in graph 924 or 912 of FIG. 9. The path data show peaks 914 and 922 corresponding to primary paths between the client device and the first network device via the main lobe. Path data of graphs 912/924 also show two peaks 916/926 and 918/928 corresponding to secondary paths between the client device and the first network device via the side lobes. As shown, each primary path peak in graph 924 or 912 has a higher amplitude and a smaller time delay compared to the secondary path peaks. In some examples, the main lobe or some side lobes may be blocked between client device 320 and network device 302 and the path data may not have the peaks corresponding to the primary path or some of the secondary paths.

Figure 10:
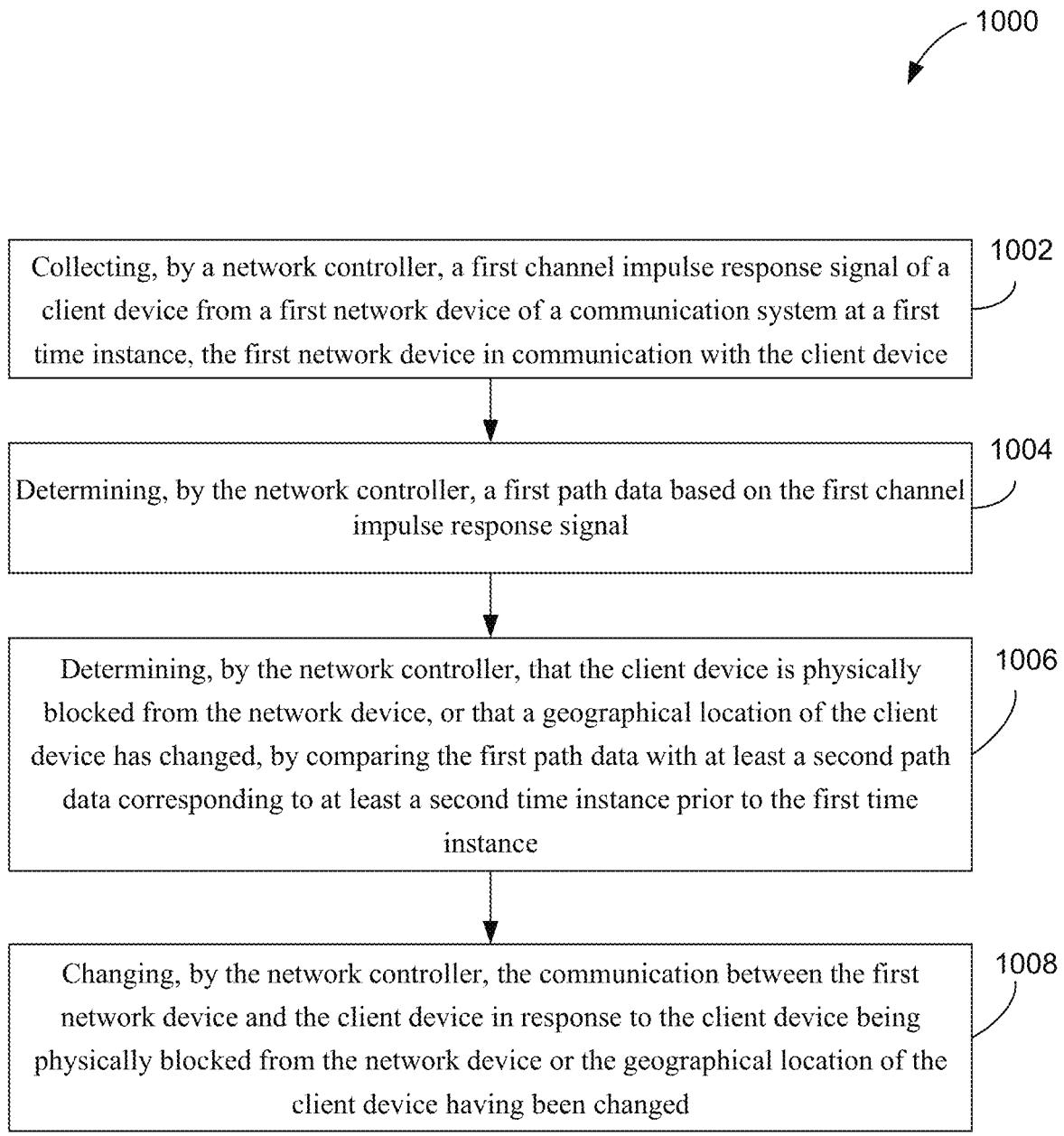
FIG. 10 illustrates a flow diagram of an exemplary process for adjusting a communication link of a client device, according to some aspects of the disclosure.

FIG. 10 illustrates a flow diagram of an exemplary process for adjusting a communication link of a client device, according to some aspects of the disclosure. Notably, one or more steps of process 1000 described herein may be omitted, performed in a different sequence, and/or combined with other processes for various types of applications contemplated herein. Process 1000 can be performed be a network controller of FIGS. 1 and 2 to adjust, e.g., tune, communication links between client devices and network devices of communication system 100.

The process 1000 begins at step 1002, where a first channel impulse response signal of a client device is collected from a first network device of a communication system at a first time instance. The first network device is in communication with the client device. Collecting the channel impulse response signal is described in more details with respect to FIG. 8. As described with respect to FIG. 8, the channel impulse response signal may be obtained by the network controller from a network device. In some examples, the channel impulse response signal is filtered and the noise is cleaned.

In step 1004, a first path data based on the first channel impulse response signal is determined. Examples of the path data are graphs 912 and 924 shown in FIG. 9. The path data includes one or more peaks, where each peak corresponds to a different path between the client device and the first network device. Each peak comprises an amplitude, e.g., a height, and a location in time. In some examples, a height of each peak corresponds to a strength of the signal received from the path corresponding to the peak, and the location is a time delay of receiving the signal from the path. In some examples, a communication link between the client device and the first network device comprises multiple paths and the path data is a signature of the communication link. As shown, each peak 914, 916, and 918 of graph 912 corresponds to a peak in graph 902.

In step 1006, it is determined if the client device is physically blocked from the first network device, or if a geographical location (e.g., a physical location) of the client device has changed. The determination is made by comparing the first path data with at least a second path data corresponding to at least a second time instance prior to the first time instance. Determining whether the client device is moved or if the client device is blocked by an object is described with respect to FIGS. 8 and 9. The determination can be made by the network device or a network controller.

In step 1008, the communication between the first network device and the client device is changed. The change is made in response to the client device being physically blocked from the network device or the geographical location of the client device having been changed. In some examples, the network may instruct the network device to change the communication between the network device and the client device when it is determined that the client device is being physically blocked by an object or the client device has moved to another physical location. In some examples, the network controller may instruct the network device to select a beamforming patterns different from the current beamforming pattern. If selecting another beamforming pattern does not resolve the problem, the network controller may instruct the first network device to hand off the client device to a second and different network device.

In some embodiments, one or more network devices are installed in a building to provide millimeter wavelength communication links with client devices. Additionally, one or more transceivers may be installed around the building to transmit and receive signals to and from the network device. The network devices can monitor communication links with the transceivers and conversely the transceivers can monitor the communication links with the network devices. Based on the monitoring, the network devices and/or the transceivers may detect an object, e.g., a human, movement in the building. In some embodiments, based on a detection of a human in a section of the building and/or based on lack of detection of a human in a predefined interval of time, a network controller may turn the lights in that section of the building on or off. In some examples, based on the detection of a human in the building an alarm may set off. In some embodiments, a system of the network device and the one or more transceivers may not include a network controller. Thus, the network device may control the turning on/off of the lights or may set off the alarm.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "module for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

What is claimed is:

1. A method comprising:
    collecting, by a network controller, a first channel impulse response signal of a client device from a first network device of a communication system at a first time instance, the first network device in communication with the client device;
        wherein the first channel impulse response signal is generated from a burst generated by the client device, and
        wherein the first network device is configured to determine a frequency-based signal and to determine the first channel impulse response signal by inverse Fourier transforming the frequency-based signal;
    determining, by the network controller, a first path data based on the first channel impulse response signal, wherein the first path data defines one or more paths that exist between the client device and the network controller and determines an amplitude of each received signal from each path with locations and amplitudes of relative maxima in the received signal where a location corresponds to a time delay of the path;
    determining, by the network controller, that the client device is physically blocked from the first network device, or that a geographical location of the client device has changed, by comparing the first path data with at least a second path data corresponding to at least a second time instance prior to the first time instance by determining if a number of peaks in the second path data has changed as compared to a number of peaks in the first path data, or if an amplitude of a peak in the first path data is changed by more than a predefined threshold value in the second path data; and
    changing, by the network controller, the communication between the first network device and the client device in response to the client device being physically blocked from the first network device or the geographical location of the client device having been changed.

2. The method of claim 1, wherein changing the communication between the first network device and the client device further comprises:
    selecting, by the network controller, a different beamforming pattern for the first network device.

3. The method of claim 1, wherein changing the communication between the first network device and the client device further comprises:
    handing off, by the network controller, the client device to a second and different network device of the communication system.

4. The method of claim 1, further comprising:
    processing the first channel impulse response signal prior to determining the first path data, wherein the processing includes filtering the first channel impulse response signal.

5. The method of claim 4, wherein the filtering includes noise reduction.

6. The method of claim 1, wherein the first network device is configured to determine a plurality of second channel impulse response signals of the client device at predetermined time intervals prior to the first time instance, and wherein the first network device is further configured to store the plurality of second channel impulse response signals.

7. The method of claim 6, wherein the first network device is configured to retrieve one or more second channel impulse response signals, to process the one or more second channel impulse response signals, and to determine one or more second path data based on the processed one or more second channel impulse response signals.

8. The method of claim 7, wherein the first network device is configured to determine the first channel impulse response signal and the one or more second channel impulse response signals as a time-based signal, and wherein each one of the first path data and the second path data is determined based on a corresponding time-based channel impulse response signal.

9. The method of claim 1, wherein determining the first path data and the second path data further includes determining a primary path and one or more secondary paths between the client device and the first network device in each one of the first path data and the second path data.

10. The method of claim 9, wherein determining the client device is physically blocked from the network device includes determining a disappearance of the primary path in the first path data when compared to a second path data corresponding to a second time instance prior to the first time instance.

11. The method of claim 2, wherein the first path data is generated by a first beamforming pattern of the first network device, wherein selecting the different beamforming pattern comprises selecting a second beamforming pattern from a plurality of beamforming patterns that are pre-configured on the first network device, and wherein a third path data corresponds to the second beamforming pattern.

12. The method of claim 11, further comprising:
    determining that selecting a different beamforming pattern for the first network device does not generate a primary path in the third path data when compared to the second path data corresponding to the second time instance prior to the first time instance; and
    in response to determining, notifying a network controller of the communication system of the determination to hand off the client device to a second and different network device.

13. A network controller, comprising:
    a memory; and
    a processor executing instructions from the memory to:
        collect a first channel impulse response signal of a client device from a first network device of a communication system at a first time instance, the first network device in communication with the client device;
  wherein the first channel impulse response signal is generated from a burst generated by the client device, and
  wherein the first network device is configured to determine a frequency-based signal and to determine the first channel impulse response signal by inverse Fourier transforming the frequency-based signal;
determine a first path data based on the first channel impulse response signal, wherein the first path data defines one or more paths that exist between the client device and the network controller and determines an amplitude of each received signal from each path with locations and amplitudes of relative maxima in the received signal where a location corresponds to a time delay of the path;
determine one or more first paths between the client device and the first network device in the first path data and one or more second paths between the client device and the first network device in at least one second path data corresponding to at least a second time instance prior to the first time instance;
determine that the client device is physically blocked from the first network device, or that a geographical location of the client device has changed, by determining if a number of peaks in the second path data has changed as compared to a number of peaks in the first path data, or if an amplitude of a peak in the first path data is changed by more than a predefined threshold value in the second path data; and
change the communication between the first network device and the client device in response to the client device being physically blocked from the network device or the geographical location of the client device having been changed.

14. The network controller of claim 13, wherein to change the communication between the first network device and the client device the processor executes instructions to select a different beamforming pattern for the first network device.

15. The network controller of claim 13, wherein to change the communication between the first network device and the client device the processor executes instructions to hand off the client device to a second and different network device of the communication system.

16. The network controller of claim 13, wherein the first network device is configured to determine a plurality of second channel impulse response signals of the client device at predetermined time intervals prior to the first time instance, wherein the first network device is further configured to store the plurality of second channel impulse response signals; and
  wherein the processor executes instructions to retrieve one or more second channel impulse response signals from the first network device, to process the one or more second channel impulse response signals, and to determine one or more second path data based on the processed one or more second channel impulse response signals.

17. A non-transitory machine-readable storage medium encoded with instructions executable by at least one processor of a network controller, the machine-readable storage medium comprising instructions to:
collect a first channel impulse response signal of a client device from a first network device of a communication system at a first time instance, the first network device in communication with the client device;
  wherein the first channel impulse response signal is generated from a burst generated by the client device, and
  wherein the first network device is configured to determine a frequency-based signal and to determine the first channel impulse response signal by inverse Fourier transforming the frequency-based signal;
determine a first path data based on the first channel impulse response signal, wherein the first path data defines one or more paths that exist between the client device and the network controller and determines an amplitude of each received signal from each path with locations and amplitudes of relative maxima in the received signal where a location corresponds to a time delay of the path;
determine a first primary path between the client device and the first network device in the first path data and a second primary path between the client device and the first network device in at least one second path data corresponding to at least a second time instance prior to the first time instance;
determine that the client device is physically blocked from the first network device, or that a geographical location of the client device has changed, by comparing the first primary path with the second primary path; and
change the communication between the first network device and the client device in response to the client device being physically blocked from the network device or the geographical location of the client device having been changed.

18. The network controller of claim 17, wherein to change the communication between the first network device and the client device the machine-readable storage medium comprises instructions to select a different beamforming pattern for the first network device.

19. The network controller of claim 17, wherein to change the communication between the first network device and the client device the machine-readable storage medium comprises instructions to hand off the client device to a second and different network device of the communication system.

* * * * *